United States Patent [19]
Bahlmann

[11] Patent Number: 5,397,977
[45] Date of Patent: Mar. 14, 1995

[54] INTEGRATED CIRCUIT COMPRISING A UNIT FOR CONTROLLING A LOAD OF AN INDUCTIVE NATURE WHICH UNIT LIMITS PARASITIC EFFECTS IN THE INTEGRATED CIRCUIT CAUSED BY VOLTAGE TRANSIENTS

[75] Inventor: Johannes P. M. Bahlmann, Eindhoven, Netherlands

[73] Assignee: U.S. Philips Corporation, New York, N.Y.

[21] Appl. No.: 23,531

[22] Filed: Feb. 26, 1993

[30] Foreign Application Priority Data

Feb. 26, 1992 [EP] European Pat. Off. ............ 92200557

[51] Int. Cl.[6] .......................... G05F 1/40; G05F 1/44
[52] U.S. Cl. .................................. 323/268; 323/265; 323/270
[58] Field of Search ..................... 323/268, 265, 270

[56] References Cited

U.S. PATENT DOCUMENTS 4,234,841 11/1980 Schade, Jr. ...................... 323/268
4,884,160 11/1989 Pasquarella ..................... 323/268 X
4,924,158 5/1990 Kelley et al. .
5,134,537 7/1992 Buss et al. ....................... 323/268 X

OTHER PUBLICATIONS

"Brushless DC Motor Drive Circuit", Philips TDA 5140, Jun. 1989.

*Primary Examiner*—Steven L. Stephan
*Assistant Examiner*—E. To
*Attorney, Agent, or Firm*—Laurie E. Gathman

[57] ABSTRACT

An integrated circuit having a unit for controlling a load of an inductive nature, which unit includes a first output transistor having a first control electrode and a first main current path, a second output transistor having a second control electrode and a second main current path, a control stage coupled to the control electrodes and adapted to control the output transistors. An output terminal is coupled between the main current paths and adapted to connect the load. In order to limit a voltage transient appearing on the output terminal, as a result of an interruption of a current flowing through the load, the control stage is coupled to the output terminal and is adapted to detect a first voltage transient on the output terminal, to turn on the second transistor in response to the first voltage transient, to detect a second voltage transient on the output terminal, which second voltage transient is opposed to the first voltage transient, and to turn off the second transistor in response to the second voltage transient.

29 Claims, 1 Drawing Sheet

INTEGRATED CIRCUIT COMPRISING A UNIT FOR CONTROLLING A LOAD OF AN INDUCTIVE NATURE WHICH UNIT LIMITS PARASITIC EFFECTS IN THE INTEGRATED CIRCUIT CAUSED BY VOLTAGE TRANSIENTS

BACKGROUND OF THE INVENTION

The invention relates to an integrated circuit including a unit for controlling a load of an inductive nature, which unit including a first output transistor having a first control electrode and a first main current path, a second output transistor having a second control electrode and a second main current path, a control stage for controlling the output transistors, a first supply terminal for receiving a first supply voltage, a second supply terminal for receiving a second supply voltage, and an output terminal for connecting the load, the first and the second control electrode being coupled to the control stage, the first main current path being coupled between the first supply terminal and the output terminal, and the second main current path being coupled between the output terminal and the second supply terminal.

Such an integrated circuit including a unit for controlling a load of an inductive nature can be used inter alia in a personal computer wherein the load is constituted by a motor of a disc drive.

Such an integrated circuit comprising a unit for controlling a load of an inductive nature is known inter alia from a chip which is commercially available under the type number TDA 5140 (Philips) at the time of filing of the present document. When a load of an inductive nature is connected to the output terminal of the known unit an undesired voltage transient is produced on the output terminal when a current flowing through the load is interrupted by the output transistors, which voltage transients is caused by the inductive nature. In order to preclude the undesired voltage transient the known unit includes a first diode coupled in parallel to the first main current path and a second diode coupled in parallel to the second main current path, the first diode allowing the passage of a current flowing through the load after an interruption by the second transistor, and the second diode allowing the passage of a current flowing through the load after an interruption by the first transistor. As a result of the conduction of the first diode the undesired voltage transient on the output terminal is limited to a first voltage which differs by one diode voltage from the first supply voltage and as a result of the conduction of the second diode the undesired voltage transient on the output terminal is limited to a second voltage which differs by one diode voltage from the second supply voltage.

However, a disadvantage of the known integrated circuit including a unit for controlling a load of an inductive nature is that the first or the second voltage gives rise to a parasitic effect causing the known integrated circuit to function in an undesirable manner.

SUMMARY OF THE INVENTION

It is an object of the invention to provide an integrated circuit including a unit for controlling a load of an inductive nature, which integrated circuit does not exhibit the parasitic effect.

In accordance with the invention an integrated circuit including a unit for controlling a load of an inductive nature is characterized in that the control stage is coupled to the output terminal and is adapted to detect a first voltage transient on the output terminal, to turn on the second transistor in response to the first voltage transient, to detect a second voltage transient on the output terminal, which second voltage transient is opposed to the first voltage transient, and to turn off the second transistor in response to the second voltage transient. The invention is based on the recognition that the parasitic effect is caused by the fact that in the known integrated circuit the first or the second supply terminal is connected to a substrate of the integrated circuit. Since the substrate is connected to the relevant supply terminal the substrate is at a substrate voltage equal to the supply voltage carried by the relevant supply terminal. When the undesired voltage transient on the output terminal is limited to a voltage which differs one diode voltage from the supply voltage which is equal to the substrate voltage, the voltage as a result of the undesired voltage transient produces the parasitic effect caused by a plurality of parasitic transistors, which parasitic transistors cause the known integrated circuit to function in an undesired manner. Since the unit of the integrated circuit in accordance with the invention includes the control stage which upon detection of the first voltage transient turns on the second output transistor and upon detection of the second voltage transient turns off the second output transistor, the undesired voltage transient is limited to a voltage which differs less than one diode voltage from the relevant supply voltage, which voltage does not give rise to the parasitic effect. In the on-state the second output transistor operates in an inverse manner, the current through the load flowing from the second supply terminal to the output terminal.

A further embodiment of an integrated circuit including a unit for controlling a load of an inductive nature may be characterized in that the control stage is further adapted to detect a third voltage transient on the output terminal, which third voltage transient is opposite to the first voltage transient, to turn on the first transistor in response to the third voltage transient, to detect a fourth voltage transient on the output terminal, which fourth voltage transient is opposed to the third voltage transient, and to turn off the first transistor in response to the fourth voltage transient. An advantage of the present embodiment is that the unit limits the undesired voltage transient on the output terminal upon an interruption of the current through the load both by means of the second transistor and by means of the first transistor. For example, when an integrated circuit is operated in a critical voltage range dictated by the first and the second supply voltage, which critical voltage range is to be understood to mean a voltage range near a breakdown voltage of the integrated circuit, the unit provides additional protection to prevent a breakdown voltage fatal to the integrated circuit from occurring on the output terminal. In the same way as the second output transistor the first output transistor operates inversely during the on-state, the current through the load flowing from the first supply terminal to the output terminal.

A further embodiment of an integrated circuit including a unit for controlling a load of an inductive nature in accordance with the invention may be characterized in that the control stage further includes a capacitor having a first and a second terminal, the first terminal being coupled to the output terminal and the second terminal being coupled to the second control electrode with a phase shifter or without a phase shifter depending upon a voltage appearing across the second output transistor. An advantage of the control stage provided with the capacitor is an improved stability, because the capacitor provides feedback from the output terminal to the control stage. However, since the second transistor is operated inversely as a result of the first voltage transient a phase jump is produced on the output terminal, by means of which phase jump the capacitor is switched so as to guarantee the stability during the first voltage transient.

A further embodiment of an integrated circuit includes a unit for controlling a load of an inductive nature in accordance with the invention may be characterized in that the control stage further includes a first comparator for detecting the voltage appearing across the second output transistor and for controlling a first transistor so as to switch over the second terminal. During the first voltage transient the second terminal of the capacitor is disconnected from a first point in the control stage by the first transistor, to which first point the second terminal is connected during a time interval outside the first and the second voltage transient, whereas during the second voltage transient the second terminal of the capacitor is coupled to the first point in the control stage.

A further embodiment of an integrated circuit includes a unit for controlling a load of an inductive nature in accordance with the invention may be characterized in that the control stage further includes a second comparator for detecting the voltage appearing across the second output transistor and for controlling a second transistor so as to switch over the second terminal. During the first voltage transient the second terminal of the capacitor is coupled to a second point in the control stage by the second transistor, to which second point the second terminal is connected during a time interval between the first and the second voltage transient, whereas during the second voltage transient the second terminal of the capacitor is disconnected from the second point in the control stage.

A further embodiment of an integrated circuit includes a unit for controlling a load of an inductive nature in accordance with the invention may be characterized in that the control stage further includes a further comparator for detecting the first voltage transient and for controlling a further transistor so as to turn on the second output transistor. The further comparator detects the first voltage transient and controls the second output transistor. The further comparator can be constructed, for example, by a differential amplifier having its first input coupled to the output terminal, having its second input coupled to a reference terminal, and having its output coupled to a control electrode of the further transistor.

A further embodiment of an integrated circuit including a unit for controlling a load of an inductive nature in accordance with the invention may be characterized in that the further comparator is further adapted to detect the second voltage transient and to control the further transistor so as to turn off the second output transistor. Apart from a simple means for detecting the first voltage transient the further comparator also detects the second voltage transient and controls the second output transistor, particularly when the comparator is implemented by the differential amplifier.

A further embodiment of an integrated circuit including a unit for controlling a load of an inductive nature in accordance with the invention may be characterized in that the unit further includes a first diode and a second diode, which first diode is coupled between the first supply terminal and the output terminal and which second diode is coupled between the output terminal and the second supply terminal. Although the integrated circuit in accordance with the invention is effectively protected by the novel control stage the diodes provide additional protection against a sudden voltage surge on the output terminal.

BRIEF DESCRIPTION OF THE DRAWINGS

The above and other (more detailed) features of the invention will now be described more elaborately with reference to the accompanying drawing, in which.

In these Figures like parts bear the same reference numerals.

DETAILED DESCRIPTION OF THE PREFERRED EMBODIMENTS

Figure 1:
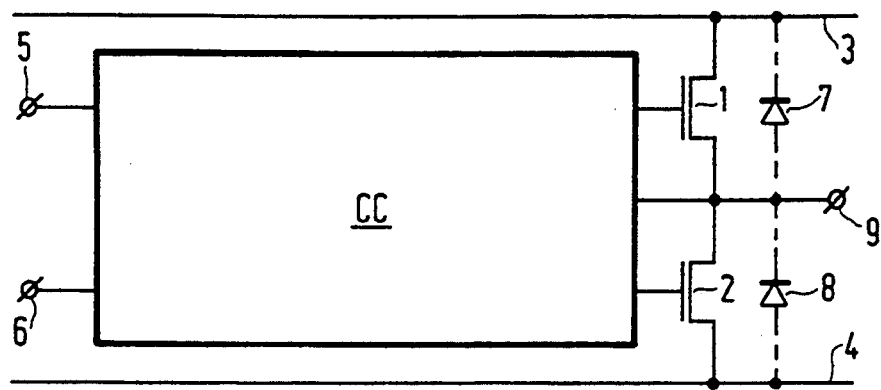
FIG. 1 shows diagrammatically an embodiment of a circuit for controlling a load of an inductive nature in accordance with the invention.

FIG. 1 shows diagrammatically an embodiment of a circuit for controlling a load of an inductive nature in accordance with the invention. This embodiment includes a first output transistor 1 having a first control electrode and a first main current path, a second output transistor 2 having a second control electrode and a second main current path, a control stage CC, a first supply terminal 3, a second supply terminal 4, a first input terminal 5, a second input terminal 6, a first diode 7, a second diode 8, and an output terminal 9. The first (1) and the second (2) control electrode and the input terminals 5 and 6 are coupled to the control stage CC. The first main current path (1) and the diode 7 are coupled in parallel between the supply terminal 3 and the output terminal 9, and the second main current path (2) and the diode 8 are coupled in parallel between the output terminal 9 and the supply terminal 4.

Although the embodiment shown in FIG. 1 includes the input terminals 5 and 6, it is generally possible to provide only one input terminal depending on the implementation chosen for the control stage CC. With regard to the diodes 7 and 8 shown in FIG. 1, it is to be noted that the diodes merely provide additional protection against a sudden current surge on the output terminal 9, which additional protection may be dispensed with. In the following description with reference to FIG. 1 it has been assumed that a first signal for controlling the output transistor 1 is applied to the input terminal 5 and a second signal for controlling the output transistor 2 is applied to the input terminal 6 and a load of an inductive nature is coupled to the output terminal 9. When the first signal turns on the output transistor 1, the output transistor 2 will be in an off-state. When the second signal turns on the output transistor 2, the output transistor 1 will be in an off-state. However, the control stage CC is adapted to limit an undesired voltage transient on the output terminal 9, which voltage transient occurs when the output transistor 1 or the output transistor 2 is driven from its on-state to its off-state. The undesired voltage transient is caused by the inductive nature of the load coupled to the output terminal 9, which inductive nature tends to sustain a current through the load in the case of an interruption. When the undesired voltage transient produces on the output terminal 9 a voltage exceeding one of the supply voltages, the voltage may cause an undesired operation of the integrated circuit as a result of a parasitic effect, particularly if the first or the second supply terminal (3, 4) is connected to a substrate of the integrated circuit. Since the substrate is connected to the relevant supply terminal the substrate will be at a substrate voltage equal to the supply voltage on the relevant supply terminal. When the undesired voltage transient on the output terminal differs by more than one diode voltage from the supply voltage (which is equal to the substrate voltage) the undesired voltage transient gives rise to a parasitic effect formed by a plurality of parasitic transistors, which parasitic transistors cause a prior-art integrated circuit to operate in an undesirable manner.

Since the unit of the integrated circuit in accordance with the invention includes the control stage CC, which first turns on the second output transistor 2 upon detection of a first voltage transient on the output terminal 9 and which subsequently turns off the second output transistor 2 upon detection of a second voltage transient on the output terminal 9, the undesired voltage transient is limited to a voltage which differs by less than one diode voltage from the relevant supply voltage, as a result of which the parasitic effect does not occur. As the first voltage transient is opposed to the second voltage transient the two voltage transients can be detected simply. During the on-state the output transistors 1 and 2 operate inversely, i.e. the drain (collector) and the source (emitter) of the output transistors are interchanged. The voltage on the output voltage can be limited adequately by giving the output transistors 1 and 2 a low conductance value.

Figure 2:
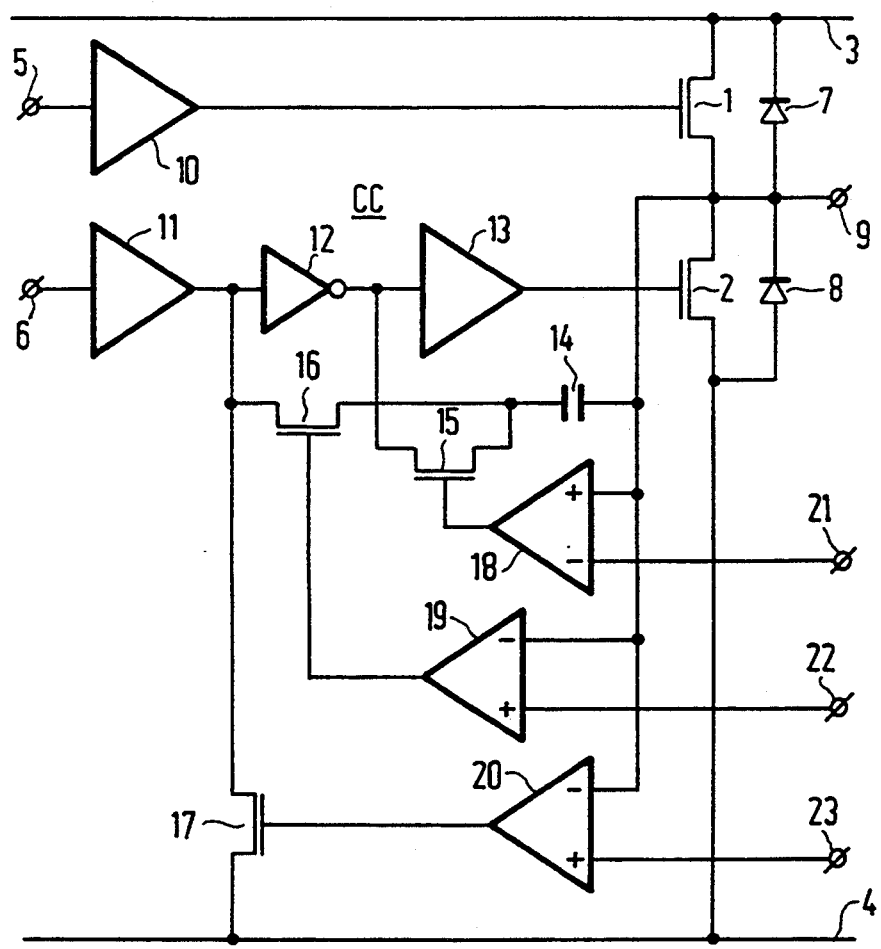
FIG. 2 shows a more detailed embodiment of a circuit for controlling a load of an inductive nature in accordance with the invention.

FIG. 2 shows a more detailed embodiment of a circuit for controlling a load of an inductive nature in accordance with the invention. The present embodiment is constructed to receive a positive voltage on the supply terminal 3 and a negative voltage on the supply terminal 4, which negative supply voltage may be equal to, for example, the substrate voltage. In addition to the elements shown in FIG. 1 the present embodiment includes a control stage CC adapted to control only the output transistor 2. The input terminal 5 is coupled to the first control electrode (1) by a buffer 10 and the input terminal 6 is coupled to the second control electrode (2) by a buffer 11, an inverter 12 and a buffer 13. The buffer 11, the inverter 12 and the buffer 13 forming a first section of the control stage CC for the output transistor 2. The first section is used both for controlling the output transistor 2 and for limiting the voltage on the output terminal 9. A second section of the control stage CC for the output transistor 2 includes a capacitor 14, a first transistor 15 having a control electrode and a main current path, a second transistor 16 having a control electrode and a main current path, a third transistor 17 having a control electrode and a main current path, a first comparator 18 having an inverting input, a non-inverting input and an output, a second comparator 19 having an inverting input, a non-inverting input and an output, a further comparator 20 having an inverting input, a non-inverting input and an output, a first reference terminal 21 for receiving a first reference voltage, a second reference terminal 22 for receiving a second reference voltage, and a third reference terminal 23 for receiving a third reference voltage. In the present embodiment, the capacitor 14 plays a central role in order to achieve the required stability for the unit. A first terminal of the capacitor 14 is coupled to the output terminal 9 and a second terminal of the capacitor 14 is coupled to a first point between the inverter 12 and the buffer 13 by the main current path of the transistor 15 and to a second point between the buffer 11 and the inverter 12 by the main current path of the transistor 16. The comparator 18 is coupled to the reference terminal 21 by the inverting input, to the output terminal 9 by the non-inverting input, and to the control electrode of the transistor 15 by the output, and the comparator 19 is coupled to the reference terminal 22 by the non-inverting input, to the output terminal 9 by the inverting input, and to the control electrode of the transistor 16 by the output. The comparator 20 and the transistor 17 play a central role in limiting the voltage on the output terminal 9. The comparator 20 is coupled to the reference terminal 23 by the non-inverting input, to the output terminal 9 by the inverting input, and to the control electrode of the transistor 15 by the output, and the transistor 15 is coupled between the second point and the supply terminal 4 by the main current path.

In the present embodiment the output transistors 1 and 2 form an analog output stage with capacitive feedback, which output stage in normal operation supplies a current to the load, the current flowing either from the supply terminal 3 to the output terminal 9 via the output transistor 1 or from the output terminal 9 to the supply terminal 4. When the load includes, for example, a first coil of a brushless motor, a second and a third coil of the motor being energized by means of similar units, the output transistors 1 and 2 are in the same state or in different states in dependence upon the first and the second signal on the input terminals 5 and 6, the output terminal 9 being connected to the positive or to the negative supply voltage.

The present embodiment will now be further described on the basis of a situation in which the output transistor 1 supplies a current flowing through the load and the output transistor 2 is cut off. After the output transistor 1 has been turned off by a signal on the input terminal 5 via the buffer 10 the voltage on the output terminal 9 will exhibit an undesired voltage transient, during which voltage transient the voltage decreases. When a negative voltage appears on the output terminal 9 the output transistor 2 is operated inversely (drain becomes source and source becomes drain) and a (180 degree) phase shift occurs. For the stability of the unit and in order to preclude positive feedback, the capacitor 14 should be disconnected in a currentless state of the output stage (1, 2) and should be coupled to a point at an inverse voltage in the control stage, which point carries a voltage with a (180 degree) phase shift. The capacitor 14 should be disconnected and coupled before the output transistor 2 is turned on. In the present embodiment this is achieved by the comparators 18, 19 and 20. When the voltage becomes smaller than the reference voltage on the reference terminal 21 (for example −100 mV) the comparator 18 turns off the transistor 15, as a result of which off-state the capacitor 14 is disconnected from the first stage in the control stage CC. When the voltage becomes smaller than the reference voltage on the reference terminal 22 (for example −150 mV) the comparator 19 turns on the transistor 16, as a result of which on-state the capacitor 14 is coupled to the second point in the control stage CC. Since the first and the second point are coupled by means of the inverter 12 the required (180 degree) phase shift is obtained. When the voltage becomes smaller than the reference voltage on the reference terminal 23 (for example −200 mV) the comparator 20 turns on the transistor 17, as a result of which the output transistor 2 is turned on and the voltage on the output terminal is limited to a level dictated by the conductance of the output transistor 2. If subsequently the voltage becomes higher than the reference voltage on the reference terminal 23, for example owing to an e.m.f. voltage in the load, the comparator 20 turns off the transistor 17, as a result of which the output transistor 2 is cut off. When the voltage exceeds the reference voltage on the reference terminal 22, the comparator 19 turns off the transistor 16, as a result of which the capacitor 14 is disconnected from the second point in the control stage CC. When the voltage exceeds the reference voltage on the reference terminal 21, the comparator 18 turns on the transistor 15, as a result of which the capacitor 14 is coupled to the first point in the control stage CC. In the control stage CC the buffer 2 may be replaced by a circuit similar to the first and the second section, which circuit limits the voltage on the output terminal 9 relative to the positive supply voltage, for example in order to prevent a breakdown voltage which is fatal to the integrated circuit from appearing on the output terminal.

The invention is not limited to the embodiments shown herein. Within the scope of the invention several modifications are conceivable to those skilled in the art. For example, the control stage may be of another construction than shown provided that the undesired voltage on the output terminal is limited to a voltage which differs from the relevant supply voltage by less than one diode voltage. Moreover, the stability of the control stage can be achieved in different ways, for example in such a way that the number of comparators being used can be reduced. Finally, it is to be noted that the transistors shown may be replaced by an equal or different number of bipolar transistors.

What is claimed is:

1. An integrated circuit for controlling a load of an inductive nature, said circuit including a first output transistor having a first control electrode and a first main current path, a second output transistor having a second control electrode and a second main current path, control means for controlling the output transistors, a first supply terminal for receiving a first supply voltage, a second supply terminal for receiving a second supply voltage, and an output terminal for connection to the load, the first and the second control electrode being coupled to the control means, the first main current path being coupled between the first supply terminal and the output terminal and the second main current path being coupled between the output terminal and the second supply terminal, characterized in that:

the control means is coupled to the output terminal and comprises first detection means for detecting a first voltage transient on the output terminal, means coupled to the first detection means for turning on the second output transistor in response to detection of the first voltage transient, second detection means for detecting a second voltage transient on the output terminal opposite to the first voltage transient, and means coupled to the second detection means for turning off the second output transistor in response to detection of the second voltage transient.

2. An integrated circuit comprising a unit for controlling a load of an inductive nature as claimed in claim 1, characterized in that the control means further comprises third detection means for detecting a third voltage transient on the output terminal, which third voltage transient is opposite to the first voltage transient, means coupled to the third detection means for turning on the first output transistor in response to the third voltage transient, fourth detection means for detecting a fourth voltage transient on the output terminal, which fourth voltage transient is opposed to the third voltage transient, and means for turning off the first output transistor in response to the fourth voltage transient.

3. An integrated circuit comprising a unit for controlling a load of an inductive nature as claimed in claim 2, characterized in that the control means further comprises a capacitor having a first and a second terminal, and a buffer, the first terminal being coupled to the output terminal and the second terminal being coupled to an input of the buffer, and an output of the buffer is coupled to the second control electrode.

4. An integrated circuit comprising a unit for controlling a load of an inductive nature as claimed in claim 2, characterized in that the control means further comprises a further transistor and a further comparator for detecting the first voltage transient and for controlling the further transistor so as to turn on the second output transistor.

5. An integrated circuit comprising a unit for controlling a load of an inductive nature as claimed in claim 2, characterized in that the unit further comprises a first diode and a second diode, which first diode is coupled between the first supply terminal and the output terminal and which second diode is coupled between the output terminal and the second supply terminal.

6. An integrated circuit comprising a unit for controlling a load of an inductive nature as claimed in claim 1, characterized in that the control means further comprises a capacitor having a first and a second terminal, and a buffer, the first terminal being coupled to the output terminal and the second terminal being coupled to an input of the buffer, and an output of the buffer is coupled to the second control electrode.

7. The integrated circuit according to claim 6, further including an inverter and wherein the second terminal of the capacitor is switchably connected to the input of the buffer, and switchably connected to an input of the inverter, and an output of the inverter is connected to the input of the buffer.

8. An integrated circuit comprising a unit for controlling a load of an inductive nature as claimed in claim 7, characterized in that the control means further comprises a first transistor and a first comparator for detecting the voltage appearing across the second output transistor and for controlling the first transistor so as to couple and uncouple the input of the buffer to and from the second terminal of the capacitor.

9. An integrated circuit comprising a unit for controlling a load of an inductive nature as claimed in claim 8, characterized in that the control means further comprises a further transistor and a further comparator for detecting the first voltage transient and for controlling the further transistor so as to turn on the second output transistor.

10. An integrated circuit comprising a unit for controlling a load of an inductive nature as claimed in claim 8, characterized in that the unit further comprises a first diode and a second diode, which first diode is coupled between the first supply terminal and the output terminal and which second diode is coupled between the output terminal and the second supply terminal.

11. An integrated circuit comprising a unit for controlling a load of an inductive nature as claimed in claim 7, characterized in that the control means further comprises a second transistor and a second comparator for detecting the voltage appearing across the second output transistor and for controlling the second transistor so as to couple and uncouple the input of the inverter to and from the second terminal of the capacitor.

12. An integrated circuit comprising a unit for controlling a load of an inductive nature as claimed in claim 11, characterized in that the control means further comprises a further transistor and a further comparator for detecting the first voltage transient and for controlling the further transistor so as to turn on the second output transistor.

13. An integrated circuit comprising a unit for controlling a load of an inductive nature as claimed in claim 11, characterized in that the unit further comprises a first diode and a second diode, which first diode is coupled between the first supply terminal and the output terminal and which second diode is coupled between the output terminal and the second supply terminal.

14. An integrated circuit comprising a unit for controlling a load of an inductive nature as claimed in claim 1, characterized in that the control means further comprises a further transistor and a further comparator for detecting the first voltage transient and for controlling the further transistor so as to turn on the second output transistor.

15. An integrated circuit comprising a unit for controlling a load of an inductive nature as claimed in claim 14, characterized in that the further comparator detects the second voltage transient and controls the further transistor so as to turn off the second output transistor.

16. An integrated circuit comprising a unit for controlling a load of an inductive nature as claimed in claim 15, characterized in that the unit further comprises a first diode and a second diode, which first diode is coupled between the first supply terminal and the output terminal and which second diode is coupled between the output terminal and the second supply terminal.

17. An integrated circuit comprising a unit for controlling a load of an inductive nature as claimed in claim 14, characterized in that the unit further comprises a first diode and a second diode, which first diode is coupled between the first supply terminal and the output terminal and which second diode is coupled between the output terminal and the second supply terminal.

18. An integrated circuit comprising a unit for controlling a load of an inductive nature as claimed in claim 1, characterized in that the unit further comprises a first diode and a second diode, which first diode is coupled between the first supply terminal and the output terminal and which second diode is coupled between the output terminal and the second supply terminal.

19. An integrated circuit comprising a unit for controlling a load of an inductive nature as claimed in claim 6, characterized in that the unit further comprises a first diode and a second diode, which first diode is coupled between the first supply terminal and the output terminal and which second diode is coupled between the output terminal and the second supply terminal.

20. An integrated circuit comprising a unit for controlling a load of an inductive nature as claimed in claim 6, characterized in that the control means further comprises a further transistor and a further comparator for detecting the first voltage transient and for controlling the further transistor so as to turn on the second output transistor.

21. An integrated circuit for controlling a load of an inductive nature, said circuit including a first output transistor having a first control electrode and a first main current path, a second output transistor having a second control electrode and a second main current path, control means for selectively switching the output transistors, a first supply terminal for receiving a first supply voltage, a second supply terminal for receiving a second supply voltage, and an output terminal for connection to the load which output terminal experiences voltage transients, the first and the second control electrode being coupled to the control means, the first main current path being coupled between the first supply terminal and the output terminal, and the second main current path being coupled between the output terminal and the second supply terminal, characterized in that: the control means controls the voltage transients at the output terminal such that the voltage transients are at levels which do not cause parasitic effects in the integrated circuit.

22. The integrated circuit according to claim 21, having a substrate connected to one of the supply voltages and the parasitic effects are caused by a voltage transient which differs by at least a diode voltage from the one of the supply voltages.

23. An integrated circuit for controlling a load of an inductive nature, said circuit comprising:
first and second supply terminals for receiving a first and a second supply voltage, respectively;
an output terminal for connection to the inductive load;
a first output transistor having (i) a first main current path coupled between said first supply terminal and said output terminal and (ii) a first control electrode for closing and opening said first main current path;
a second output transistor having (i) a second main current path coupled between said second supply terminal and said output terminal and (ii) a second control electrode for closing and opening said second main current path;
control means coupled to the first and second control electrodes for selectively switching said main current paths of said first and second transistors to control the flow of current from said supply terminals to said inductive load, said circuit being constructed such that, during said switching to control the current to said load, said output terminal is subject to voltage transients of sufficient magnitude to cause parasitic effects therein when both of said main current paths are open,
wherein the improvement comprises:
said control means includes means for temporarily closing said main current path of at least one of said first and second output transistors to reduce the voltage transients at the output terminal to a level where parasitic effects in the integrated circuit are avoided.

24. The integrated circuit according to claim 23, wherein the integrated circuit includes a substrate and one of said first and second supply terminals is connected to said substrate.

25. The integrated circuit according to claim 24, wherein the first and second main current paths are each shunted by a diode, and the parasitic effects are caused by voltage drops across said diodes caused by current flow through said diodes during the voltage transients.

26. An integrated circuit for controlling a load of an inductive nature, comprising:

first and second supply terminals for receiving a first and a second supply voltage, respectively;

an output terminal for connection to the inductive load;

a first output transistor having (i) a first main current path coupled between said first supply terminal and said output terminal and (ii) a first control electrode for closing and opening said first main current path;

a second output transistor having (i) a second main current path coupled between said second supply terminal and said output terminal and (ii) a second control electrode for closing and opening said second main current path;

a parallel element connected electrically in parallel with one of said output transistors, between said one output transistor's respective supply terminal and said output terminal, said parallel element exhibiting a voltage drop greater than said one output transistor when an equivalent current flows therethrough;

control means coupled to the first and second control electrodes for controlling said first and second output transistors, said control means including (i) first means for selectively opening and closing said first and second main current paths for controlling the current flow from said first and second supply terminals through said output terminal into said inductive load;

(ii) first detecting means for detecting a first voltage transient occurring at said output terminal caused by continued current flow in said inductive load after both of said first and second current paths are open;

(iii) means for closing said main current path of said one transistor in response to detection of the first voltage transient to shunt current, flowing between said output terminal and the respective supply terminal of said one transistor as a result of the first voltage transient, through said one transistor, thereby preventing a voltage drop across said parallel element;

(iv) second detecting means for detecting at said output terminal a second voltage transient subsequent to and opposed to the first voltage transient; and (v) means for opening said main current path of said one transistor in response to detection of the second voltage transient.

27. The integrated circuit according to claim 26, wherein the parallel element is a diode having an anode and a cathode wherein said anode is connected to said output transistor's respective supply terminal and said cathode is connected to said output terminal.

28. The integrated circuit according to claim 27, wherein the integrated circuit includes a substrate and one of said first and second supply terminals is connected to said substrate.

29. The integrated circuit according to claim 28, wherein a second diode having an anode and a cathode is connected electrically in parallel with the other of said output transistors, wherein said cathode of said second diode is connected to the other output transistor's respective supply terminal and said anode of said second diode is connected to said output terminal.

* * * * *